United States Patent

Mateker, Jr.

[15] 3,671,930

[45] June 20, 1972

[54] METHOD OF SEISMOGRAPHIC EXPLORATION BY MEASURING THE ATTENUATION COEFFICIENT IN GEOLOGIC SECTION

[72] Inventor: Emil J. Mateker, Jr., Houston, Tex.

[73] Assignee: Western Geophysical Company of America, Houston, Tex.

[22] Filed: June 18, 1970

[21] Appl. No.: 47,235

[52] U.S. Cl. .................. 340/15.5, 340/15.5, 340/15.5 AC
[51] Int. Cl. ........................................... G01v 1/28
[58] Field of Search .................................. 340/15.5

[56] References Cited

UNITED STATES PATENTS 3,270,316   8/1966   Walker, Jr. et al. ............ 340/15.5 AC
3,362,011   1/1968   Femanek, Jr. .................. 340/15.5 AC
3,251,029   5/1966   Savage et al. .................. 340/15.5 AC

OTHER PUBLICATIONS

A. T. Hermont, " Is Seismic Energy of Diagnostic Value?" 4/69, p. 196– 205, pg. 208– 212,

*Primary Examiner*—Benjamin A. Borchelt
*Assistant Examiner*—N. Moskowitz
*Attorney*—Michael P. Breston, Alan C. Rose, Walter R. Thiel and Alfred B. Levine

[57] ABSTRACT

This invention pertains to a method of seismographic exploration. At an observation station reflected seismic signals from the reflected interfaces in a geologic section are recorded as an observed amplitude-time recording. At a reference station the reflected seismic signals are recorded as a reference amplitude-time recording. The reference recording is converted to a reflectivity function, and the observed amplitude-time recording is divided by the reflectivity function to obtain a desired amplitude function from which is derived a measure of the attenuation coefficient of the reflected seismic signals in the studied geologic section.

4 Claims, 2 Drawing Figures

Emil J. Mateker, Jr.
INVENTOR.

BY

MICHAEL P. BRESTON
ATTORNEY.

METHOD OF SEISMOGRAPHIC EXPLORATION BY MEASURING THE ATTENUATION COEFFICIENT IN GEOLOGIC SECTION

BACKGROUND OF THE INVENTION

In seismic exploration of the earth by the reflection method it has been customary to initiate a seismic disturbance at or near the surface of the earth (or at sea, at or near the surface of the water), and to detect and record the amplitude of the returning, reflected seismic signals by means of arrays, detectors, and recording apparatus well known in the art.

Hitherto, the seismic amplitude information in the reflected signals has been used only to detect, define, and delineate major subterranean discontinuities between different rock layers. That is, when the amplitude of a seismic signal is found to be somewhat greater than that of the background signal, it is assumed that such an anomalous amplitude is evidence of the reflection of seismic waves from such a discontinuity. Persistence of such an increased amplitude among successive positions along a line or survey is taken as confirmation of the existence of a discontinuity, comprising an extensive surface, between two different rock formations.

In the prior art no attempt is made to determine the nature of the rocks involved. All of the displays and the analysis of the seismograph data are based solely on the rock-strata configurations determined from a knowledge of the location and orientation of the discontinuities. Identification of lithology or rock type is confined to information obtained at outcrops or in drilled wells. Persistence of lithological identity along strata delineated by the seismic method is generally assumed.

A given stratum is laterally continuous by reason of having been laid down or formed contemporaneously throughout its lateral extent. It is, however, well known that economically significant accumulations of petroleum or natural gas are frequently identified with lateral changes in the lithologic character of a stratum. To detect changes in the lithology of a stratum by use of reflection seismic data has long been a desideratum of the exploration industry.

It is well known that one physical property of a rock type which depends upon lithologic character is the rate of attenuation undergone by an acoustic or seismic wave as it traverses a section of rock of that type.

SUMMARY OF THE INVENTION

This invention provides a method of seismograph exploration by determining a measure of the attenuation of the reflected seismic signals in a geologic section under investigation. Acoustic waves are propagated through the section from at least one transmission station to obtain an observed amplitude-time recording. The reflected seismic signals are also detected at an adjacently located station to obtain a reference amplitude-time recording. The reference recording is converted to a reflectivity function, and the observed recording is divided by the reflectivity function to obtain a desired amplitude function. The logarithm of the desired amplitude function is then determined at a plurality of discrete travel times; and the value of each logarithm is divided by the corresponding value of the discrete travel time to obtain a measure of the attenuation coefficient applicable to the subsurface position traversed by the reflected seismic signals at the corresponding travel time.

Figure 1:
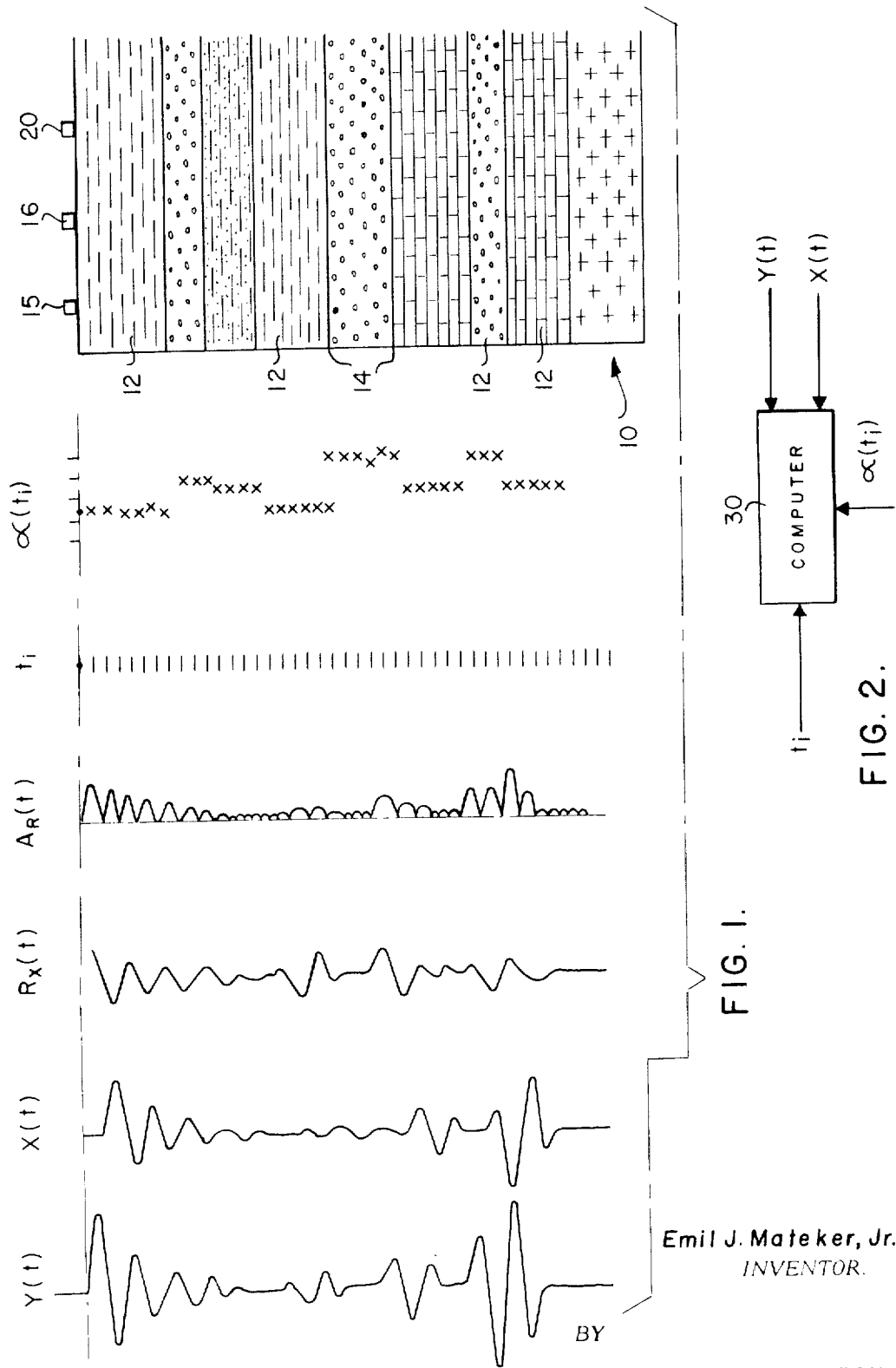
FIG. 1 is a diagrammatic representation of a typical geologic section undergoing seismographic exploration.

Attenuation undergone by a seismic wave in traversing a given rock stratum is manifested by a decrease in the amplitude of the seismic wave in excess of the decrease in amplitude as a result of geometric spreading. Geometric spreading is explained by the observation that if a sound wave is initiated at a point in a homogeneous, isotropic medium, that sound wave will radiate in the form of an expanding spherical wave front whose center is at the point of initiation. Since the medium cannot add energy to the sound wave, and if the medium is perfectly elastic and does not subtract energy from the sound wave, the energy in the wave will remain constant. Since, however, the spherical wave is expanding, and the total energy must remain constant while being distributed over an ever larger surface, the energy passing through a unit area of the sphere will decrease in inverse proportion to the surface area of the sphere. A given detector of fixed area will, therefore, detect the sound wave at an energy level inversely proportional to the area of the sphere. Since it is proved in classical solid geometry that the area of a sphere is directly proportional to the sphere of the radius, it follows that the detected energy is inversely proportional to the square of the distance from the point of initiation to the detector.

Also, since the medium is assumed to be homogeneous, the distance traversed by the sound wave is the product of the velocity of sound in the medium by the travel time of the sound wave.

Therefore, the energy E at any unit area on the expanding wave is $$E = kt^{-2} \qquad 1.$$

where $t$ is the travel time and $k$ is a constant of proportionality.

If now the medium is still perfectly elastic but not homogeneous, this same relationship between energy and travel time can be shown to be a reasonably accurate description of the actual geometrical spreading effect. Likewise, it can be shown that, on the average, the amplitude of a sound wave is proportional to the square root of its energy so that one finally arrives at the working formula $$A = k'/t, \qquad 2.$$

where $A$ is the amplitude of the sound wave and $k'$ is another constant of proportionality. This relationship is well known to be valid even after the sound wave has undergone specular reflection provided that the corresponding reflection coefficient is equal to unity.

For purposes of clarity the following description is written on the basis that sound waves traversing or being reflected from a discontinuity or interface are substantially perpendicular to that interface. This is termed the case of "normal incidence." Generalizations of the equations and procedures given below to cases of non-normal incidence are well known and will be apparent to those skilled in the art of seismology.

In the case of rock strata in a real geologic section, the individual strata are generally assumed to be vertically homogeneous and subject to gradual lateral variations. Reflection coefficients at the interfaces between strata are never equal to one but have a substantially lower value which rarely exceeds 0.1.

It is thus clear that sound waves in a real geologic section will be reduced not only by geometric spreading but also by loss of energy upon reflection. In addition, the sound wave that is transmitted through an interface is reduced in amplitude as a result of loss to the sound wave reflected at the interface and to mode conversion from a longitudinal acoustic wave to reflected and transmitted shear waves. The loss to mode conversion is relatively insubstantial at or near normal incidence and may be calculated in the significant non-normal incidence cases from a knowledge of propagation velocities and an estimate of Poisson's ratio.

Any energy lost by the reflected sound wave, over and above the losses from geometrical spreading, partial reflection, and mode conversion, is assumed to have been dissipated in traversing the individual rock strata. Such losses are here termed attenuation losses, and the relative loss is proportional to the distance traversed. The constant of proportionality is known as the attenuation coefficient and is ordinarily given in units of nepers per meter. Thus $$dE/E = -a(ds) \qquad 3.$$

where $a$ is the attenuation constant of the medium and $s$ is the distance traversed by the wave in the medium.

It follows that $$E = c \; exp(-as) \qquad 4.$$

where $c$ is a constant of integration. Finally, on converting to variables of amplitude and time as above $$A = exp(-\alpha t + \beta),\qquad 5.$$

where $\alpha$ is proportional to $a$ and $\beta$ is a constant.

Further, in a real geologic section, the quantity $\alpha$ changes value with change in rock type. Thus, from a general view of a real geologic section the attenuation parameter $\alpha$ could be considered to vary continuously with depth, hence with the travel time of the seismic wave. Thus, one can write Equation 5 in the form $$A(t) = 0 exp[-\alpha(t) + \beta].\qquad 6.$$

This invention, therefore, comprises a method of obtaining estimated values of the attenuation parameter $\alpha$ as a function of travel time from seismic reflection data. Fundamentally such a determination is made by converting a seismic reflection time-amplitude recording at a given position along a line of survey to a form equivalent to that expressed in Equation 6 by use of a suitably chosen neighboring time-amplitude recording from either the same seismic disturbance or a previous or subsequent seismic disturbance.

Thus, if such a conversion is made to an idealized amplitude $A(t_i)$ at time $t_i$ the attenuation parameter corresponding to the $i^{th}$ sample in a discrete set of samples is given by $$\alpha(t_i) = \frac{-1}{t_i} \ln [|A(t_i)|]. \qquad (7)$$

Therefore the attenuation parameter $\alpha$ applicable to the subsurface position traversed by the seismic wave at travel time $t_i$ is obtainable from the ideal quantity $A(t_i)$ and the observed time $t_i$. This calculation can be repeated for all discrete values of time in the recording to yield a curve of the variation of the attenuation parameter $\alpha$ as a function of travel time.

In actual practice the observable amplitudes on a reflection seismic recording are not representative of the amplitudes that would obtain in the absence of geometrical spreading, and in the idealized case of perfect reflection. It is therefore necessary that both geometrical spreading and the effect of reflection be taken into account before applying Equation 7.

In a commonly used reflection seismic exploration procedure, seismic signals are recorded by the well-known digital, binary-gain procedure in which detected seismic amplitudes are recorded in a code which is equivalent to floating point notation and is thus capable of preserving the full range of received amplitudes.

To practice the present invention it is necessary to obtain (at least up to a multiplicative constant) the actual values of signal amplitudes. It is therefore a preferred practice to use binary-gain recording and not to apply any automatic volume or gain controls. Even the use of programmed gain is preferably to be avoided as errors may be introduced by use of programmed gain and the consequent application of a gain recovery procedure.

In editing seismographic data for use in the present invention, it is preferred to retain the data in floating point (or binary gain) form throughout the preparatory stages of processing and to apply only a geometric spreading correction as, for example, by multiplying all amplitudes by the reflection time.

If no gain or amplitude compensation except that for geometric spreading has been applied to the data, it will be presumed that all amplitude variations remaining are attributable to attenuation effects and to the effects of reflection from discontinuities with reflection coefficients less than unity.

In order to remove the effects of reflection from the time-amplitude recording which has previously been corrected for geometrical spreading, it is necessary to determine the time-varying reflectivity function. In the prior art A. J. Hermont in Geophysics (1969), v. 39, No. 2, p. 196–212, suggested the use of a synthetic seismogram constructed from continuous velocity measurement in a well for this purpose. This suffers from the unavailability of sufficient or even any wells in most areas under exploration by the reflection seismic method. Even when such velocity data are available, improper knowledge of the waveform(s) to be used prevents one from making a satisfactory synthetic seismogram to be applied over an area of exploration.

In a presently preferred embodiment of this invention one uses a reference time-amplitude recording made at a neighbor station to, and collected simultaneously (from the same seismic disturbance) with, the observed time-amplitude recording (corrected for geometric spreading) from which the attenuation parameter $\alpha$ is to be computed. The reflectivity function is constructed from this reference time-amplitude recording. This reflectivity function is then used to convert the observed time-amplitude recording to a form suitable for use in Equation 7. It is to be understood that the neighbor recording could be made from a separate seismic disturbance if the difference in input energy is suitably measured, or a source is used which is fired repetitively and inputs the same amount (or nearly so) of energy each time, such as the gas sleeve exploders currently in use in marine exploration under the trademark Aquapulse.

Let, $$Y(t) = A_0 \exp[-\alpha_y(t)t] R_6(t) \qquad 8.$$

represent the observed time-amplitude recording (corrected for geometric spreading) where $Y(t)$ is the observed amplitude function, $A_0$ is an initial amplitude, $\alpha_y(t)$ is the attenuation parameter to be determined as a function of the geologic section traversed, and $R_y(t)$ is the reflectivity function.

Let, $$X(t) = A_0 \exp(-\alpha_x t) R_x(t) \qquad 9.$$

represent the reference time-amplitude recording (corrected for geometric spreading) where $X(t)$ is the reference amplitude function, $\alpha_x$ is the reference attenuation parameter, and $R_x(t)$ is the reference reflectivity function. To find the reflectivity function $R_x(t)$ from Equation (9) one needs to find a suitable value for $\alpha_x$. This can be obtained by forming the absolute value of $X(t)$, taking the natural logarithm of these absolute values, and noting that the maximum values of the logarithm of these absolute values approximately forms a straight line given by $$\ln|X(t)|_{max} = -\alpha_x t + c \qquad 10$$

whose slope is $\alpha_x$. Thus, the logarithms of these maximum absolute values (or a series of points around each maximum) are fit in a least square sense (or some other suitable computational procedure) to obtain the best straight line for which $\alpha_x$ is obtained.

Thus, the reflectivity function $R_x(t)$ (or $R_x(t(/A_0)$ can be determined from Equations 9 as $$R_x(t) = Y(t) \exp(-\alpha_x t) \qquad 11.$$

It is to be understood that should more than one value of $\alpha_x$ be required to obtain the best estimate of $R_x(t)$, the function $\ln|X(t)|_{max}$ can be divided into regions and best fit in each region as outlined above, thereby determining an $\alpha_x$ for each region for use in an appropriate equation of the form of Equation 11.

Since the reference time-amplitude recording from which $R_x(t)$ is determined is a neighbor to the observed time-amplitude reading, one assumes that $R_x(t) = R_y(t)$ so that from Equation 8

$$A_R(t) = \frac{Y(t)}{R_x(t)} = \exp[-\alpha_y(t)t], \qquad (12)$$

where $A_R(t)$ is the desired amplitude function for use in Equation 7. Since this process is carried out on digital seismic data at discrete times one arrives at the working equation $$\alpha(t_i) = \frac{-1}{t_i} \ln [|A_R(t_i)|]. \qquad (13)$$

A value $\alpha$ for each discrete time $t_i$ is thus determinable from observed quantities and may be used in the form of a display similar to that of a conventional record section of seismic amplitudes by substituting the so obtained values of $\alpha$ for the conventional amplitude values. The computations may alternatively be made (as is well known in the art) to yield other measures of attenuation such as, for example, the logarithmic decrement.

Alternatively, the attenuation values may be displayed in conjunction with other values as more completely described in copending application, Ser. No. 853,467, assigned to the same assignee.

In FIG. 1 there is shown a geologic section 10. Section 10 includes a plurality of subsurface layers 12, such as shale, sandstone, limestone, granite, etc. Acoustic waves are propagated through section 10 from at least one transmission station 15. The corresponding reflected seismic signals from the reflecting interfaces 14 are detected at an observation station 16 to provide an observed amplitude-time recording $Y(t)$. At a reference station 20, preferably located immediately adjacent to the observation station 16, are also detected the reflected seismic signals from the reflecting interfaces 14 to obtain the reference amplitude time recording $X(t)$. The reference amplitude time recording is then converted to the reference reflectivity function $R_x(t)$. The observed amplitude time recording is divided by the reflectivity function to obtain the desired amplitude function $A_R(t)$.

Figure 2:
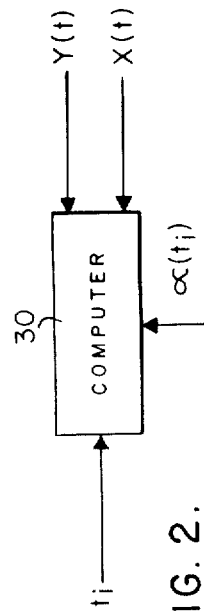
FIG. 2 represents a digital computer adapted to carry out the required mathematical operations.

The logarithm of the desired amplitude time function is determined at a plurality of distinct travel times $t_i$. The value of each logarithm is divided by the corresponding value of the travel time $t_i$ to obtain a measure of the attenuation coefficient $\alpha(t)$ applicable to the subsurface position within section 10 at $t_i$. The various mathematical manipulations required by the equations set forth above can be conveniently carried out by a computer 30, as shown in FIG. 2. The inputs to computer 30 are $Y(t)$, $X(t)$, and $t_i$ and the output is $\alpha(t_i)$. The computations can also be carried out by hand with the use of logarithm and other standard tables.

The above-described method is particularly applicable to the well known, common-depth point shooting method in which the shooting stations are very close to each other, and the observation station and the reference station can be adjacent stations in the same recording group or adjacent detector groups. Best results are obtained when the observation station and the reference station are located as near to each other as conveniently possible.

What I claim is:

1. A method of seismographic exploration over the earth's surface by determining a measure of the attenuation coefficient of reflected seismic signals in a geologic section under investigation comprising the steps of:
   propagating acoustic waves through said section from at least one transmission station;
   detecting at an observation station reflected seismic signals from the reflecting interfaces within said section to obtain an observed amplitude-time recording;
   detecting at a reference station reflected seismic signals from said reflecting interfaces to obtain a reference amplitude-time recording;
   said transmission, observation, and reference stations being located substantially at the earth's surface;
   converting said reference amplitude-time recording to a reflectivity function;
   operating on said observed amplitude-time recording with said reflectivity function to obtain a desired amplitude-time function; and
   determining the logarithm of the desired amplitude-time function at a plurality of discrete travel times for said reflected signals, thereby obtaining attenuation data corresponding to subsurface layers within aid section.

2. The method of claim 1 wherein, said reference station is located adjacent to said observation station.

3. A method of seismographic exploration by determining a measure of the attenuation coefficient of reflected seismic signals in a geologic section under investigation comprising the steps of:
   propagating acoustic waves through said section from at least one transmission station;
   detecting at an observation station reflected seismic signals from the reflecting interfaces within said section to obtain an observed amplitude-time recording;
   detecting at a reference station reflected seismic signals from said reflecting interfaces to obtain a reference amplitude-time recording;
   converting said reference amplitude-time recording to a reflectivity function;
   dividing said observed amplitude-time recording by said reflectivity function to obtain a desired amplitude-time function;
   determining the logarithm of the desired amplitude-time function at a plurality of discrete travel times for said reflected signals; and
   dividing the value of each logarithm by the corresponding value of the travel time to obtain a measure of said attenuation coefficient applicable to the subsurface position within said section traversed by said reflected signals at said corresponding travel time.

4. The method of claim 3 wherein, said reference station is located adjacent to said observation station.

* * * * *